United States Patent

Pollack et al.

(10) Patent No.: US 6,581,976 B1
(45) Date of Patent: Jun. 24, 2003

(54) SWIVEL SEAL CONSTRUCTION

(75) Inventors: Jack Pollack, Monaco (MC); Robert Martin Hobson, Roquebrune Cap Martin (FR); René Perratone, Menton (FR)

(73) Assignee: Single Buoy Moorings Inc., Marly (CH)

(*) Notice: Subject to any disclaimer, the term of this patent is extended or adjusted under 35 U.S.C. 154(b) by 0 days.

(21) Appl. No.: 09/856,054
(22) PCT Filed: Nov. 17, 1999
(86) PCT No.: PCT/EP99/09051
§ 371 (c)(1),
(2), (4) Date: Aug. 17, 2001
(87) PCT Pub. No.: WO00/29774
PCT Pub. Date: May 25, 2000

(30) Foreign Application Priority Data

Nov. 17, 1998 (EP) .............................................. 98203895

(51) Int. Cl.[7] .................................................. F16L 33/16
(52) U.S. Cl. ...................... 285/98; 285/121.6; 285/106; 285/95
(58) Field of Search ................................ 285/121.6, 94, 285/96, 106, 95, 111, 190, 272, 98

(56) References Cited

U.S. PATENT DOCUMENTS

| 3,351,360 A | * | 11/1967 | Faccou ................. 285/121.6 X |
| 3,411,811 A | * | 11/1968 | Holland ........................ 285/94 |
| 3,884,511 A | * | 5/1975 | Hermanson ................ 285/98 X |
| 4,462,617 A | * | 7/1984 | Green ........................ 285/98 X |
| 4,602,806 A | * | 7/1986 | Saliger ...................... 285/98 X |
| 4,647,076 A |   | 3/1987 | Pollack et al. |
| 4,662,657 A | * | 5/1987 | Harvey et al. ................. 285/96 |
| 4,828,292 A | * | 5/1989 | Jansen ................. 285/121.6 X |
| 4,925,219 A | * | 5/1990 | Pollack et al. ................. 285/95 |
| 5,312,140 A | * | 5/1994 | Pollack ...................... 285/98 X |
| 5,411,298 A | * | 5/1995 | Pollack .......................... 285/94 |
| 5,860,680 A | * | 1/1999 | Drijver et al. ................. 285/95 |
| 6,234,540 B1 | * | 5/2001 | Drijver et al. ................ 285/98 |

FOREIGN PATENT DOCUMENTS

| EP | 359415 | * | 3/1990 | .................. 285/94 |
| WO | WO 86/00972 |   | 2/1986 | |
| WO | WO 98/31963 |   | 7/1998 | |

* cited by examiner

Primary Examiner—Lynne H. Browne
Assistant Examiner—David E. Bochna
(74) Attorney, Agent, or Firm—Young & Thompson

(57) ABSTRACT

A swivel (40) includes an outer (41) and inner annular wall (42). A toroidal chamber (44) is defined between the outer and inner walls and opposing peripheral faces of the walls define an upper (45) and lower gap (52) extending respectively upwardly and downwardly from the toroidal chamber. The upper and/or lower gap has a first section (46) extending axially, a second section (47) transverse to the first section (46) and a third section (48) extending substantially parallel to the first section (46). A seal (50, 51) is placed in the second (47) or the third (48) section of the upper and/or lower gap (25, 52), the seal having two flexible legs (61, 62) arranged in a generally u-shaped or v-shaped orientation. The gap near the area of the seal is filled with a sealing fluid during use.

8 Claims, 6 Drawing Sheets

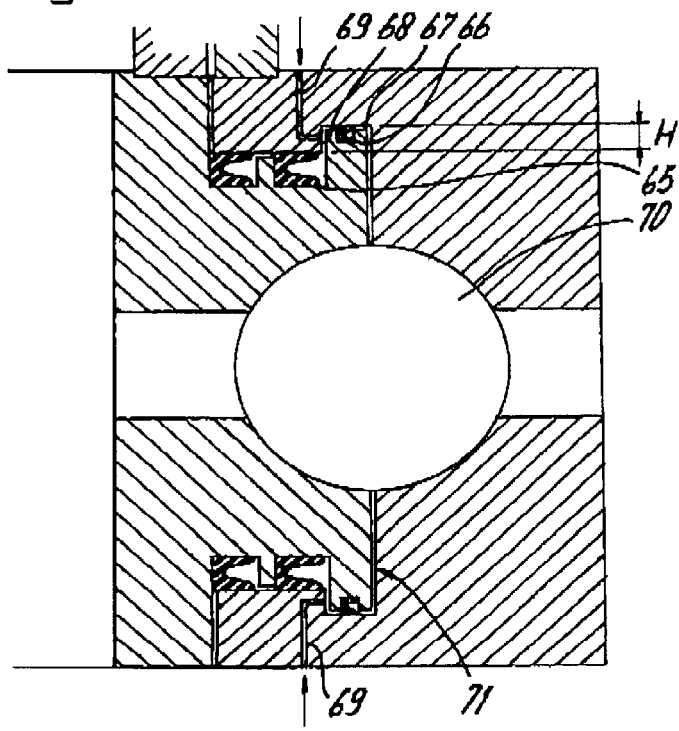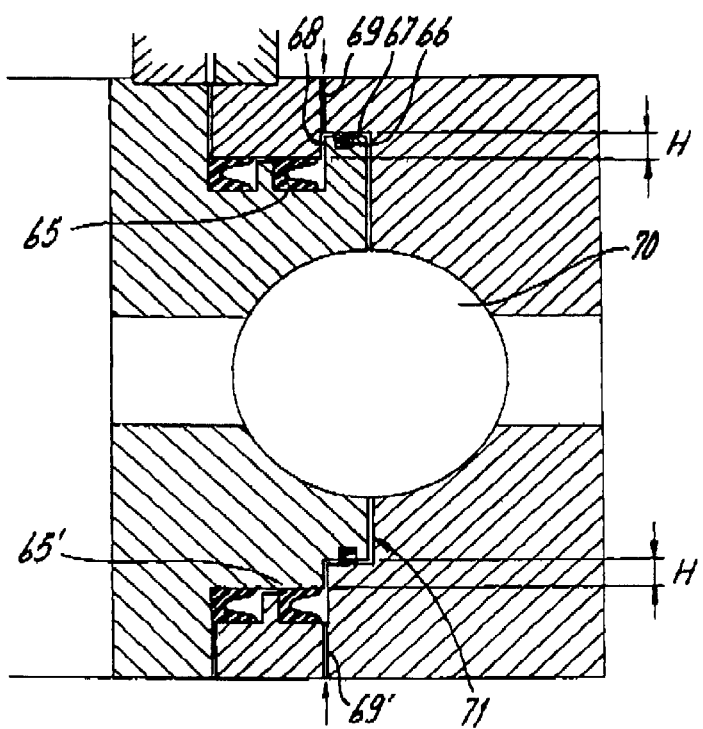

SWIVEL SEAL CONSTRUCTION

FIELD OF THE INVENTION

The invention relates to a swivel comprising an outer annular wall and an inner annular wall coaxial with the outer wall, the outer and inner walls defining a toroïdal chamber and an upper and a lower gap between their peripheral opposing faces. The upper and/or lower gap has a first section extending axially from the toroïdal chamber, a second section extending generally transversely to the first section, and a third section extending at least partly substantially parallel to the first section. A seal is placed in the second or the third section of the upper and/or lower gap, the seal having two flexible legs arranged in a generally u-shaped or v-shaped orientation. During use, the gap near the area of the seal is filled with a sealing fluid, such as oil. A fluid duct extends through the outer or inner annular wall to the gap and has an outlet in the gap section between the seal and the toroïdal chamber, and means for transporting a flushing substance, such as oil, under pressure through the duct to the toroïdal chamber.

THE KNOWN PRIOR ART

From WO 98/31963 a toroïdal swivel is known for transfer of hydrocarbons from a subsea oil well to a weathervaning floating production storage and offloading vessel (FPSO). In the toroïdal chamber that is enclosed by the stationary inner wall and rotating outer wall, the hydrocarbons are distributed towards the outlet in the rotating outer wall part. Within the toroïdal chamber pressures of 150–300 bar prevail tending to force the outer and inner walls apart. Due to pressure fluctuations, the gap between the walls will vary in width and may become widened such that the seals in the gap can be extruded from the gap. In order to construct a gap which is reduced in width upon internal pressurisation of the toroïdal chamber, a specific configuration of the gap between the swivel walls is disclosed in WO 98/31963 in the name of the applicant. According to the teachings of the above patent application, the outer wall comprises L-shaped or bevelled parts extending radially inwards with respect to the inner swivel wall, which comprises complementary L-shaped or sloping parts extending radially outwards. When the outer swivel wall is displaced in a radially outward direction due to the pressure in the toroïdal chamber, the L-shaped elements of the inner and outer walls, between which the extrusion gap is defined, are pressed together such that the width of the gap decreases.

With the known construction, a narrow gap between both walls can be obtained using relatively large tolerances upon manufacturing. However, the known system may give rise to problems especially when used in transporting gas or mixtures of oil and gas, or oil and water. For their proper functioning, the seals in the gap must at all times be surrounded by oil. If an oil-gas mixture or an oil-water mixture (there is always some gas and water in crude oil) enters the toroïdal chamber, gas will be released from the oil and travels upwards towards the upper gap and may expel oil from the seal area, whereas water will travel towards the lower seal area and expel the oil in which the lower seal is immersed. This gives rise to seal wear and improper seal functioning which will lead to leakage of hydrocarbons via the extrusion gap.

In another known swivel construction, having the features according to the preamble of claim 1, an isolation seal, or silt seal is located between the dynamic, or primary seals and the toroïdal chamber. On one side of the isolation seal an oil pressure duct ends in the extrusion gap to pressurise the isolation seal and to create substantially equal pressures on each side of the isolation seal. The purpose of the isolation seal is to contain the oil around the primary seals, an to prevent the oil from running freely into the toroïdal chamber upon tilting of the swivel. The isolation seal can be of a relatively light construction compared to the primary seal and has its flexible legs oriented towards the toroïdal chamber, or can be formed by a solid ring of PTFE-material. Furthermore, the isolation seal prevents the ingress of contaminating substances such as sand, to the primary seals. In order to remove contaminations from the seal area, it is known to flush these seal by injecting oil into the extrusion gap via the oil duct, which oil is passed along the isolation seal at an overpressure towards the toroïdal chamber. Also in this construction, the ingress of gas or water along the isolation seal, towards the primary seal can lead to malfunctioning of the primary seal. In case the oil is removed from the area of the primary seal it can, due to the large pressure difference across said seal, be subject to increased wear, bursts or cracks and consequent leakage.

OBJECT OF THE INVENTION

It is an object of the present invention to provide a swivel in which the primary seal can be properly maintained in a clean oil environment and in which gas escaping from the oil or water separated from oil is prevented from expelling oil from the seal areas and does not impair the functioning of the seal.

SUMMARY OF THE INVENTION

Thereto the swivel according to the present invention is characterised in that the primary seal is placed in the second gap section, or in the third gap section at a position (H) below the outer part of the first gap section, the outlet of the fluid duct being placed in the second gap section or in the third gap section.

It was found that by placing the primary seal that is located closest to the toroïdal chamber, not further away from the toroïdal chamber than the outer end of the first, vertically extending section of the extrusion gap, an efficient accumulation and transfer of the lighter fluid fraction (gas) for the upper part of the toroïdal chamber, or of the heavier fluid fraction (water) for the lower part of the toroïdal chamber, back towards the toroïdal chamber can be achieved upon flushing of the extrusion gap by the flushing fluid, such as oil, supplied via the oil duct.

An embodiment of the swivel according to the present invention is characterised in that the length (H) of the third gap section part between the primary seal and the second (horizontal) gap section is between 1 cm and 10 cm.

According to this construction a sufficient volume is present for accumulation and transfer of gas or water being separated from the oil in the seal area. The gas or water will travel up- or downwardly respectively to fill the space above the seal, leaving the seal itself in an oil environment. The lower extrusion gap may be formed as a mirror image of the upper gap, the seal area of the lower gap being immersed in heavy oil which has a greater density than water.

In a further embodiment according to the present invention the lower gap is substantially straight. As the problem of expulsion of oil in the seal area by gas only occurs at the upper gap, the lower gap can be constructed in a relatively simple manner using only axial, or piston-type seals, i.e. seals having their flexible legs parallel to the cylindrical peripheral services of the inner and outer annular walls. For safety reasons a secondary seal may be used behind the primary seal.

BRIEF DESCRIPTION OF THE DRAWINGS

An embodiment of a swivel according to the present invention will be explained in detail with reference to the accompanying drawings. In the drawings.

DETAILED DESCRIPTION OF THE PRIOR ART

Figure 1:
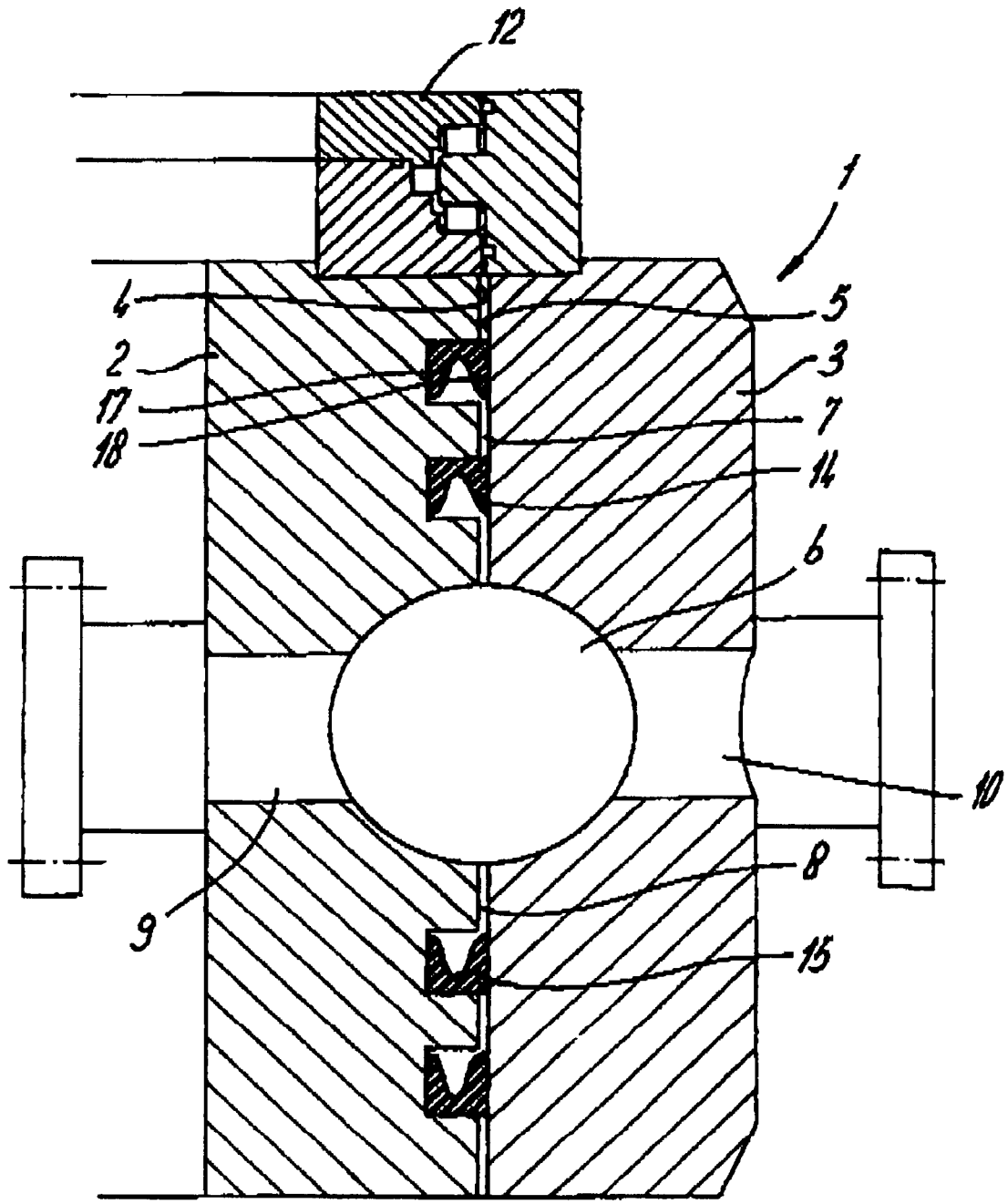
FIG. 1 shows a first prior art sealing arrangement for a swivel construction for crude oil.

FIG. 1 shows a known swivel 1 comprising an inner annular wall 2, an outer annular wall 3 and a toroïdal chamber 6 enclosed by the inner and outer walls. The inner and outer walls 2, 3 are located with their cylindrical surfaces 4, 5 in close proximity such that an upper gap 7 and a lower gap 8 with a width of about 0.35 mm is formed between said surfaces. Hydrocarbons may be supplied from a geo-stationary inner duct 9, extending through the inner wall 2 towards the toroïdal chamber 6. Via the toroïdal chamber 6, the hydrocarbons are transferred to the rotating outer annular wall 3 to be transported to product piping connected to duct 10 extending from the toroïdal chamber 6 to the outer peripheral surface of the outer wall 3. The inner and outer annular walls are rotatably connected via an axial-radial bearing 12. The upper and lower gaps 7, 8 are sealed by elastically deformable sealing rings 14, 15 which are of generally U-shaped or V-shaped form. The legs 17, 18 of each seal contact cylindrical surfaces of the peripheral faces of the annular walls 2, 3. Recesses are provided within the inner annular wall 2 to accommodate the piston type sealing rings 14, 15 shown in FIG. 1. Pressures within the toroïdal chamber 6 may amount from 150–300 bar, the swivel 1 weighing about 20 ton. The diameter of the swivel 1 may be between 0.5 m and 2 m or larger, having a wall thickness of about 250 mm.

Figure 2:
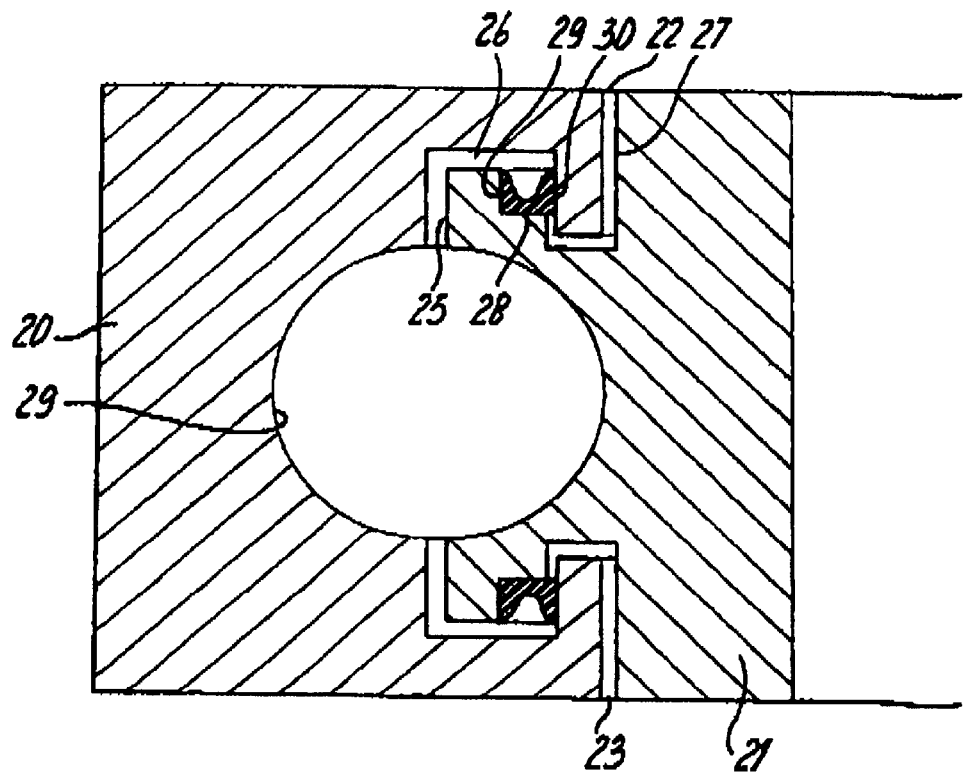
FIGS. 2, 3 show further embodiments of prior art swivels having a self-closing gap between the inner and outer annular walls.

As is shown in the prior art embodiment of FIG. 2, the upper gap 22 and the lower gap 23 between the inner annular wall 21 and the outer annular wall 20 have a meandering configuration. The upper gap comprises a first gap section 25 extending generally vertically, a second gap section 26 generally transverse to the first gap section and a third gap section 27 located generally parallel to the first gap section, spaced at a radial distance therefrom. The seal 28 has its legs 29, 30 facing towards the part of the upper gap 25 which ends in the toroïdal chamber 29. When the known system is used for transferring crude oil, gas or water or mixtures of those, gas separated from the crude oil will travel upwards within the first gap section 25 towards the seal 28. The water that is separated from the crude oil will travel downwards to the lowermost seal. In a water injection swivel the water will also tend to migrate towards the lower seal area. The gas and/or water will accumulate near the primary seal area and expel any (crude) oil therefrom. This will result in a dry, gaseous environment or a water environment for the primary seal which damages the seal and creates seal leakage.

Figure 3:
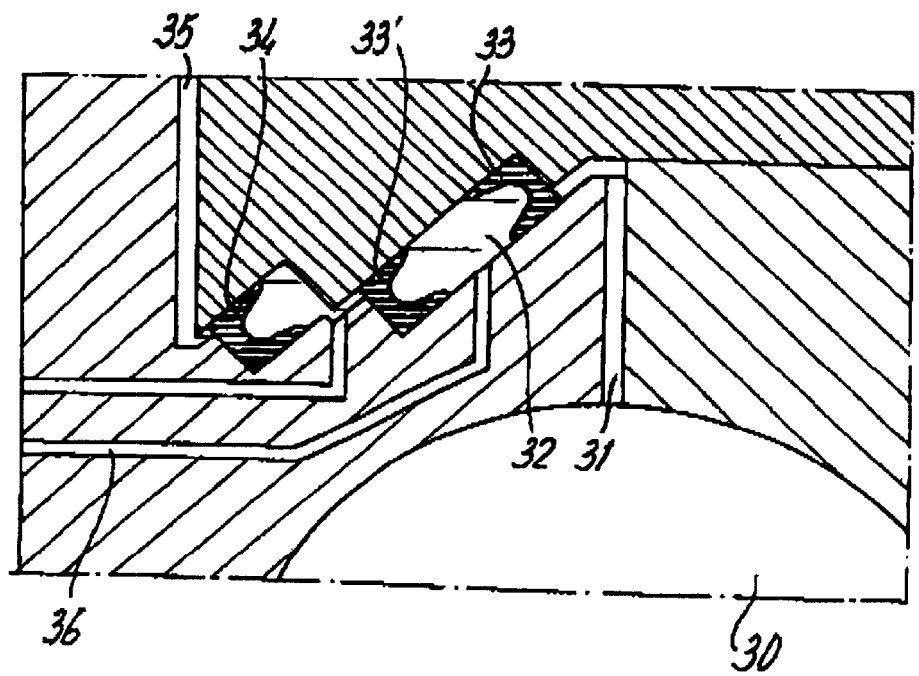

In the embodiment shown in FIG. 3, the upper gap section 31 extends vertically upwards from the toroïdal chamber 30. The second gap section 32 extends sloping downwards from the first vertical gap section towards the third vertical gap section 35. Two sealing elements 33, 33' are placed in the second gap section 32, with their flexible legs facing each other. The legs of the sealing element that is located closest to the first vertical gap section 31 (the isolation seal) face away from the toroïdal chamber 30. Clean oil is injected in the space between the sealing elements 33 via an oil pressure duct 36. As the isolation seal of the sealing elements 33 has its flexible legs facing the oil pressure duct 36, no flushing of oil past the isolation seal into the toroïdal chamber 30 is possible. For a gas swivel this means that the seal 33 which faces away from the toroïdal chamber 30 and which has a pressure difference over it, works on one side in a continuous dry environment which will damage this seal. In case of a crude oil swivel the seal 33 will also be working in a dry environment due to the gases separating from the crude oil. Hence gas accumulating above the isolation seal cannot be removed, and will eventually expel the oil in the vicinity of the isolation seal, and may migrate past said seal towards the primary seal.

Figure 4:
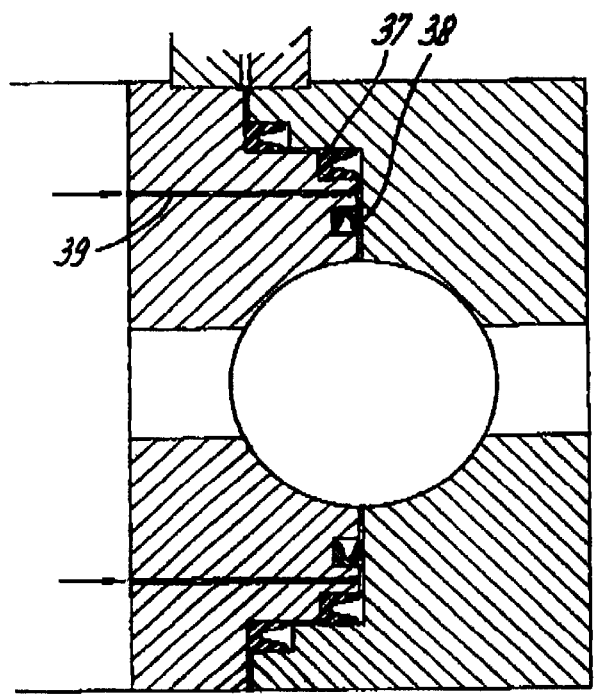
FIG. 4 shows a known swivel comprising a flushing fluid duct in the vertical extrusion gap section.

FIG. 4 shows a prior art embodiment wherein the primary seal 37 is a face-type seal which is located at the upper end of the first gap section of the extrusion gap. The oil duct 39, for flushing oil past the isolation seal 38 to the toroïdal chamber, is located below the primary seal 37, such that gas accumulating in the area of the primary seal 37 cannot effectively be removed.

DETAILED DESCRIPTION OF THE INVENTION

Figure 5:
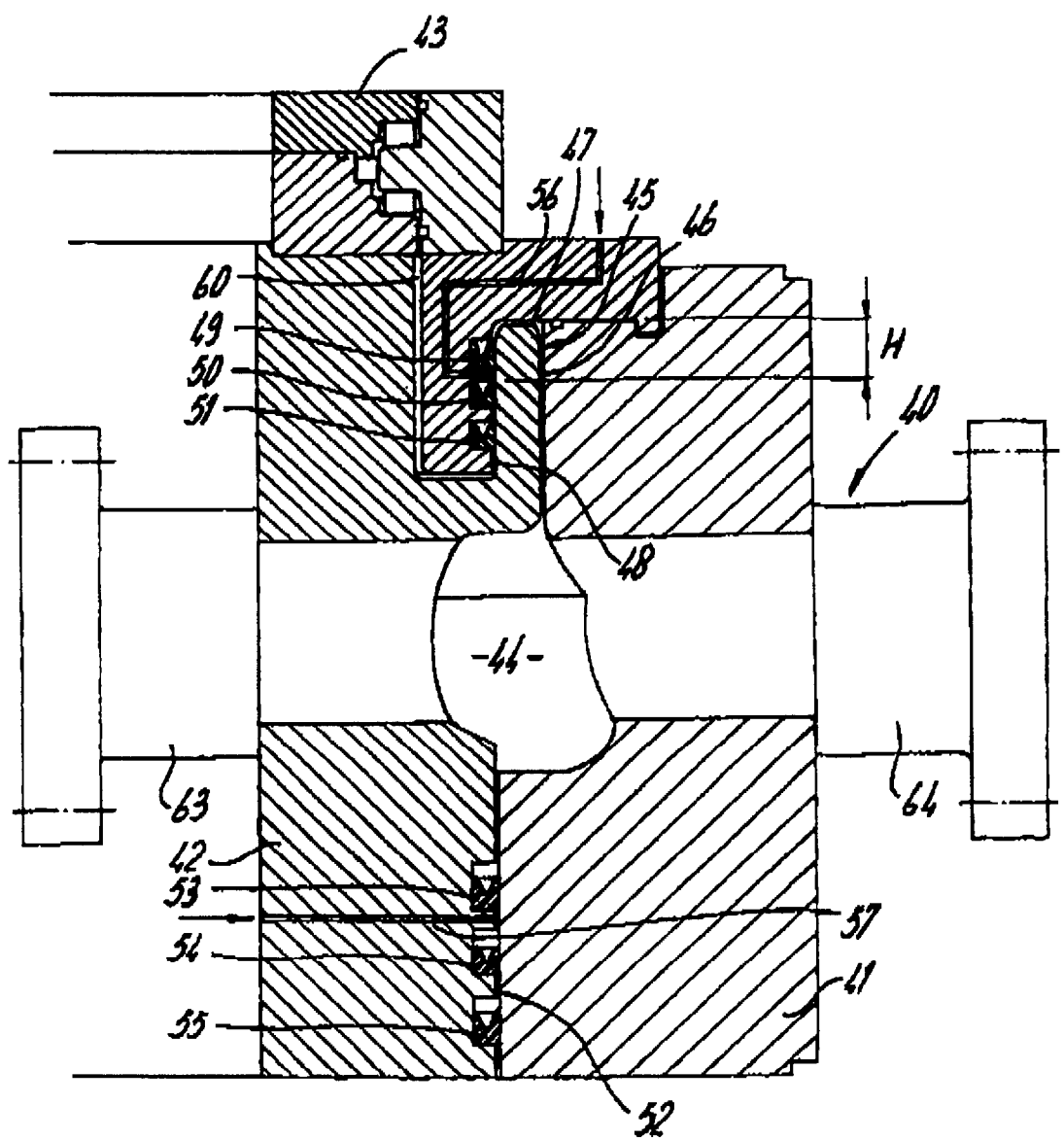
FIG. 5 shows an embodiment of a swivel construction according to the present invention.

FIG. 5 shows a crude oil swivel 40 with outer annular wall 41 and inner annular wall 42. The outer and inner walls 41, 42 are rotatably connected via an axial-radial bearing 43. A geostationary duct 63 is connected to the inner wall 42, a product pipe 64 being connected to the outer wall 41. At the upper part of the toroïdal chamber 44, the upper gap 45 between the inner wall 42 and outer wall 41 comprises a first vertical gap section 46 and a horizontally extending gap section 47. A third gap section 48 extends substantially parallel to the first gap section 46. Three seals 49, 50, 51 (isolation seal, primary seal and secondary seal, respectively) are placed in the third gap section 48 having their legs facing towards the second gap section 47. Oil is present in the spaces above each seal 49, 50 and possibly above 51 in the gap section 46 and in the space of the horizontal gap section 47. Between the first seal 49 and the second seal 50 of the upper gap and between the first seal 53 and the second seal 54 of the lower gap 52, two respective oil injection ducts 56, 57 are provided for supplying pressurised oil to the seals 49, 50 and possibly to 53 and 54 for a proper flushing of contaminants from the seal area back into the toroïdal chamber 44 and to add clean oil on top of these seals.

When gas is separated from the crude oil in the chamber 44 and rises into the area of the seals it can accumulate in the part of the gap section 48 which is located above the seal 49 and can from there by flushing clean oil across seal 49, be forced backwards into the horizontal gap section 47 without reaching the primary seal 50. From there on the gas may be transported downwardly through the gap section 46 to be flushed back towards the toroïdal chamber 44.

At the lower end of the toroïdal chamber 44, the lower gap 52 has a substantially straight-line shape, three seals 53, 54, 55 being placed in the lower gap 52. The lower seals 53, 54, 55 in the lower gap 52 do not suffer from gas separation from the oil, which may expel oil from the seal areas. Instead, they can suffer from water separation from the crude oil which may expel oil from the lower seal area. The lower gap 52 can be formed relatively simple having a straight line path. Clean oil heavier than water (so called heavy oil) can be injected through a duct 57 above seal 53, but is preferably injected between the seals 53 and 54 such as shown in FIG. 5. The heavy oil flushes contaminants and water back into the chamber 44 and forms a water barrier on top of the seals 53 and 54.

Figure 6:
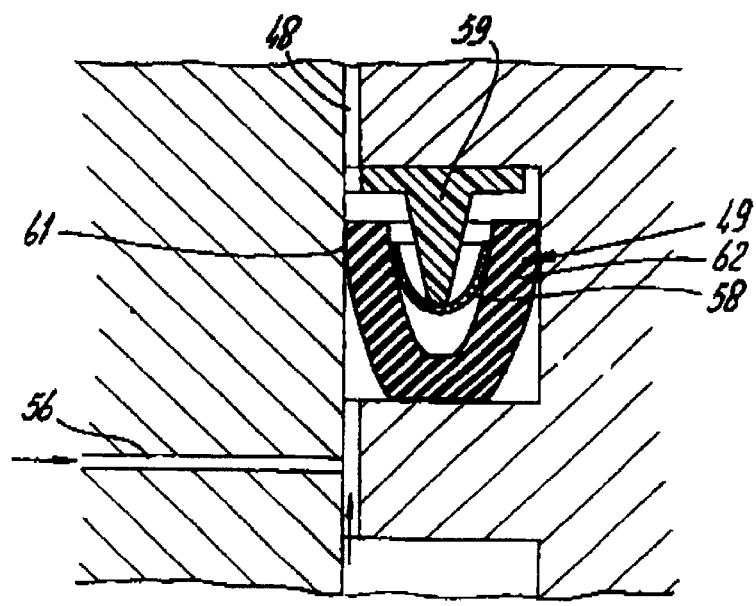
FIG. 6 shows a detail of an isolation seal used in the sealing arrangement of FIG. 5, and FIGS. 7, 8 and 9 show further embodiments of a swivel according to the present invention.

FIG. 6 shows an enlarged detail of the upper seal 49 as shown in FIG. 5, having flexible legs 61, 62. The upper seal 49 comprises between its legs 61, 62 a metal spring element 58. To prevent the legs of the seal 49 from being collapsed against each other upon a pressure drop in the toroïdal chamber 44, a bending restriction element 59 is comprised between the legs of the sealing element 49. When clean (heavy) oil is injected for a limited time period through injection duct 56 at a pressure larger than the pressure in the chamber, the lip 61 will be forced towards lip 62 and the clean oil will be flushed into the direction of the chamber 44. The seal 49 closes the gap again when the overpressurisation through duct 56 stops.

FIG. 7 shows a swivel embodiment, wherein the primary seal 65 is placed in a horizontal part of the third gap section 68 of the extrusion gap. The oil injection duct 69 ends in the vertical part of the third gap section 68, whereas the isolation seal 66 is placed in the horizontal gap section 67. If the seals 65 are placed at a sufficient distance H below the horizontal gap section 67, a sufficiently deep oil or grease (liquid or semi solid fluid) trap is formed such that upon tilting of the swivel the oil or grease will remain in the area of the primary seals, and the isolation seal 66 may in that case be omitted. The distance H will be determined by the maximum roll of the vessel, the swivel diameter and the viscosity of the injected fluid and will preferably vary between 1 cm and 10 cm.

The lower extrusion gap 71, at the bottom of the toroïdal chamber 70 is of similar shape as the upper extrusion gap. In the seal areas of the lower gap 71, clean oil may be provided which expels water that has separated from the crude oil into the direction of the chamber 70. The extrusion gap construction of FIG. 7 prevents ingress of water towards the lower primary seal. In case the swivel shown in FIG. 7 is used as a crude oil swivel or as a gas swivel, light oil (lighter than water) may be injected into the upper and lower oil pressure ducts 69, 69' respectively. In case the swivel shown in FIG. 7 is used as a water injection swivel, light oil may be injected through the lower duct 69', heavy oil being injected through upper duct 69.

FIG. 8 shows an embodiment of a swivel, wherein the area of the upper seal 65 is different from the area of the lower seal 65', but wherein both primary seals 65, 65' are located at a distance H below the end part of the vertical gap section. In the swivel construction according to FIG. 8, heavy oil is injected through the upper and lower ducts 69, 69' for crude oil swivels, gas swivels and water injection swivels.

Figure 9:
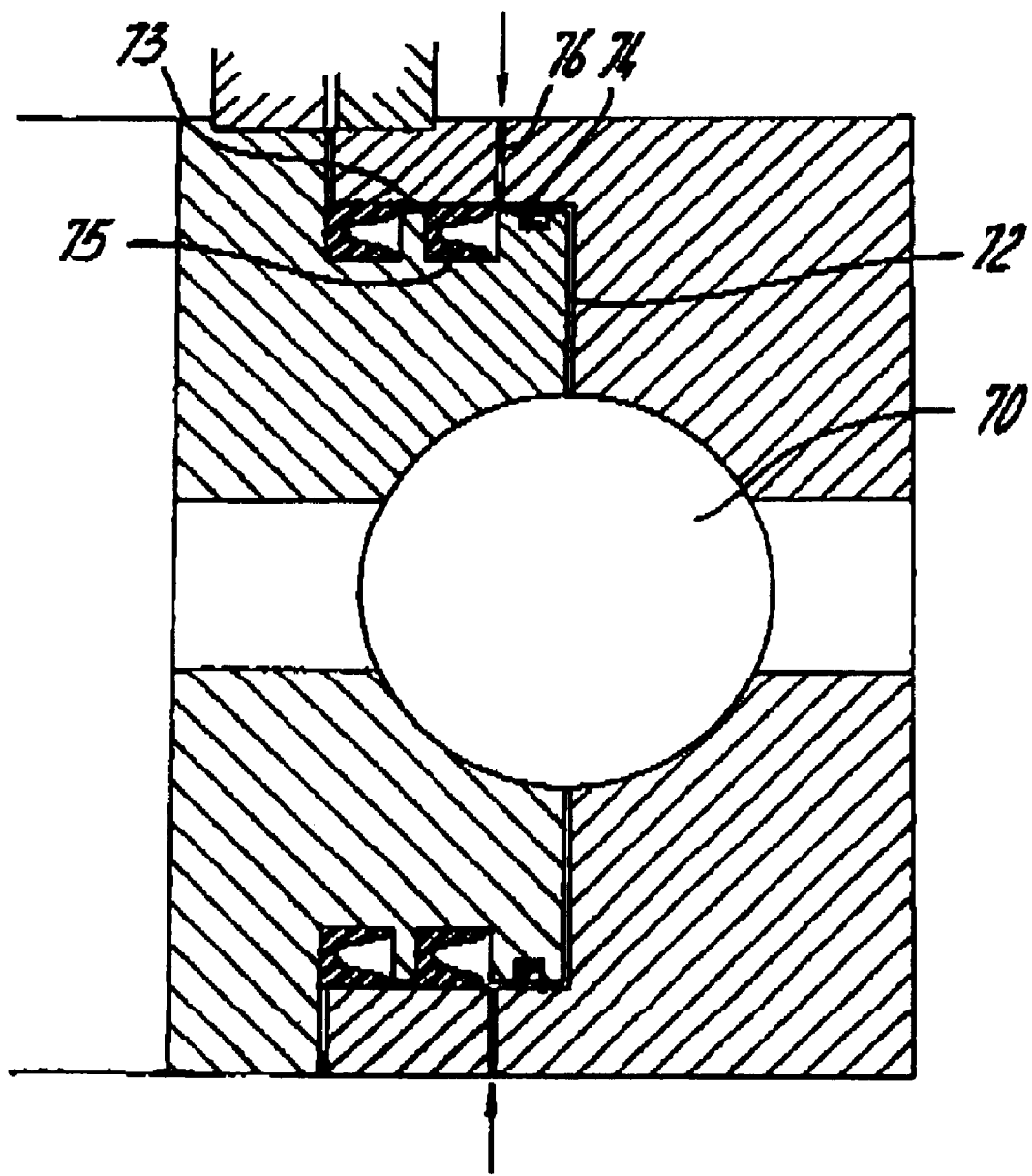

FIG. 9 finally shows an embodiment wherein the isolation seal 74, the primary seal 75 and the outlet of the oil injection duct 76 are all located in the horizontal duct section 73.

What is claimed is:

1. In a swivel (40) comprising an outer annular wall (41) and an inner annular wall (42) coaxial with the outer wall, the outer and inner walls defining a toroidal chamber (44) and an upper (45) and a lower gap (52), between their peripheral opposing faces, at least one gap (45, 52) having a first section (46) extending axially from the toroidal chamber (44) to an end part, a second section (47) extending from the end part transversely to the first section (46), and a third section (48) extending in an axial direction, two seals (49, 50, 51) in at least one of the second (47) and third (48) section of the gap (45, 52), the seals having two flexible legs (61, 62) arranged in a generally u-shaped or v-shaped orientation, the legs extending in a direction of fluid flow toward the toroidal chamber 44, the gap at the seal position being filled with a sealing fluid during use, a fluid duct (56) extending through the outer or inner annular wall (41, 42) to the gap (45, 52) and having an outlet in the gap section between the seals (49, 50, 51), and means for transporting a flushing fluid under pressure through the duct (56) to the toroidal chamber; the improvement wherein a fluid seal (49) is placed in the second or third gap section (47, 48), each seal being placed at an axial distance (H) from the end part of the first gap section (46), closer to the toroidal chamber (44) than the end part, the seal (49) located between the outlet of the fluid duct (56) and the toroidal chamber (44) being an isolation seal allowing the flushing fluid to pass from the duct (56) to the toroidal chamber (44).

2. Swivel (40) according to claim 1, wherein the seal (50, 51) is located in the third gap section (48), the distance (H) of the seal (50, 51) from the end part of the first gap section (46) being between 1 and 10 cm to allow fluid having a density different from oil, to accumulate in the gap section between the seal (50, 51) and the first gap section (46).

3. Swivel (40) according to claim 1, wherein the upper gap (45) comprises in the second or third section (47, 48) at least two similarly shaped seals (50, 51), the legs of which are oriented towards the part of the gap ending in the toroidal chamber.

4. Swivel (40) according to claim 1, wherein the lower gap (52) and the upper gap (45) are symmetrical with respect to a horizontal plane.

5. Swivel (40) according to claim 1, wherein the lower gap (52) is straight.

6. Swivel (40) according to claim 1, wherein the flushing fluid is clean oil.

7. Swivel (40) according to claim 1, wherein the flushing fluid is grease.

8. Swivel (40) according to claim 1, wherein the flushing fluid is an oil which is heavier than water.

* * * * *